United States Patent [19]

Carson

[11] Patent Number: 4,713,268

[45] Date of Patent: Dec. 15, 1987

[54] CRYSTALLIZABLE POLYESTER RESIN HAVING HIGH IMPACT STRENGTH AND DIMENSIONAL STABILITY

[75] Inventor: William G. Carson, Moorestown, N.J.

[73] Assignee: Rohm and Haas Co., Philadelphia, Pa.

[21] Appl. No.: 938,224

[22] Filed: Dec. 5, 1986

[51] Int. Cl.[4] .................... B65D 5/00; B32B 27/08; B32B 27/36
[52] U.S. Cl. ..................................... 428/35; 426/113; 428/220; 428/480; 428/483
[58] Field of Search ................ 428/480, 483, 35, 220; 524/291; 525/177; 426/113, 114; 220/557

[56] References Cited

U.S. PATENT DOCUMENTS

| | | | |
|---|---|---|---|
| 4,388,356 | 6/1983 | Hrivnak et al. | 428/35 |
| 4,456,164 | 6/1984 | Foster et al. | 428/35 X |
| 4,463,121 | 7/1984 | Gartland et al. | 524/291 |
| 4,572,852 | 2/1986 | Gartland et al. | 428/35 |

*Primary Examiner*—Thomas J. Herbert
*Attorney, Agent, or Firm*—John E. Taylor, III

[57] ABSTRACT

Strong, tough, ovenable trays may be formed from poly(ethylene terephthalate) modified with 4–29% core/shell polymer, 0–14.5% aromatic polycarbonate and 1–5% aromatic polyester crystallization-rate accelerator.

38 Claims, No Drawings

CRYSTALLIZABLE POLYESTER RESIN HAVING HIGH IMPACT STRENGTH AND DIMENSIONAL STABILITY

This invention relates to poly(ethylene terephthalate) polymer compositions, more particularly to such compositions which are suitable for forming ovenable plastic trays, and the trays formed from such compositions.

BACKGROUND OF THE INVENTION

Aluminum had previously dominated the materials for making trays in which frozen foods may be both stored and cooked in an oven. The advent of microwave ovens has created a need for non-metallic trays which may be safely heated in both conventional and microwave ovens. Such trays should retain reasonable strength and dimensional stability over a range of temperatures from about −18° C. to about 230° C.; they must resist embrittlement at the lower temperatures, distortion and yellowing at the higher temperatures, and should resist torsion and flexion sufficiently to allow removal of a hot tray and contents from an oven without sagging and spilling the contents. Materials such as paper and various polymers, including polyesters such as poly(ethylene terephthalate), have been used with varying degrees of success.

McTaggart, U.S. Pat. No. 3,960,807, has used modified poly(ethylene terephthalate) to make ovenable trays. This modified poly(ethylene terephthalate) contains a "crack-stopping" agent, which he teaches is a non-conjugated polyolefinic material, and a nucleating agent, which he teaches is a finely divided, inorganic material.

Gartland, U.S. Pat. No. 4,463,121, teaches that the inorganic nucleating agent of McTaggart, above, may be omitted while retaining adequate crystallization times. Gartland further teaches optional use of a heat stabilizer, which he discloses as substituted phenols, bisphenols and substituted bisphenols, aromatic amines, organic phosphites and the like.

The polyester resins are formed into trays by first extruding a sheet of the polyester, then stamping out a tray blank and thermoforming the blank in a tray mold. For this operation to be successful, the extruded sheet should be largely amorphous so that the tray may be readily thermoformed at temperatures up to about 200° C., but the tray composition, after thermoforming, must crystallize to form a rigid structure that will not deform at temperatures well above 200° C. Such a crystallization must be rapid, because requirements for holding the formed tray for any significant period of time at high temperatures, as in the hot tray mold or in a heated chamber, reduce the number of trays that can be produced in a given time. The crystallization must not, however, be too rapid; the composition must allow time for quenching the extruded sheet prior to crystallization; it must also allow time for re-heating to thermoforming temperatures and for the thermoforming step itself.

Accordingly, an object of the present invention is a composition suitable for making ovenable trays that will crystallize rapidly but not instantaneously at thermoforming temperatures. Another object of the invention is an ovenable tray that is useful for storing foods at temperatures as low as −18° C. and for containing foods being cooked at temperatures as high as 230° C.

Other objects of the present invention will be apparent from the specification and claims below.

SUMMARY OF THE INVENTION

I have discovered a polymer composition which provides the requisite strength and dimensional stability over the range of about −18° C. to about 230° C., and which further provides the necessary rapid but not instantaneous crystallization time, for suitability to the preparation of ovenable trays. As another aspect of my invention I have discovered ovenable trays of crystalline polymer made from this composition. This polymer composition comprises from about 70 to about 95% poly(ethylene terephthalate) modified with from about 4 to about 29% of an core/shell polymer, from about 1 to about 5% of an aromatic polyester crystallization-rate accelerator, and from about 0 to about 14.5% of an aromatic polycarbonate, the weight ratio of core/shell polymer to aromatic polycarbonate, where present, being from about 5:1 to about 1:1.

DETAILED DESCRIPTION OF THE INVENTION

Broadly, the poly(ethylene terephthalate) useful in the present invention is that having a relatively high molecular weight; such polyesters have marginally adequate toughness, but low crystallization rates accompanying the high molecular weight. A suitable molecular weight for poly(ethylene terephthalate) useful in the present invention is that indicated by an intrinsic viscosity of from about 0.70 to about 1.10, preferably from about 0.72 to about 0.95, deciliters/gram (dl/g), measured at 30° C. for a solution of the polymer in 60/40 phenol/tetrachloroethane. All intrinsic viscosities given herein are measured at these conditions unless otherwise noted, and all percentages and ratios are by weight unless otherwise noted.

The core/shell polymers useful in the present invention include those described in the Fromuth et al U.S. Pat. Nos. 4,180,494 and 4,264,487, which are hereby incorporated into the present specification by reference. The preferred core/shell polymers are those of U.S. Pat. No. 4,264,487.

These core/shell polymers comprise from about 25 to about 95% of a first elastomeric phase polymerized from a monomer system comprising from about 75 to about 99.8% of a monomer or monomer mixture which yields a rubbery polymer on polymerization, from about 0.1 to about 5% crosslinking monomer and from about 0 to about 5% graftlinking monomer, and from about 5 to about 75% of a vinyl, rigid thermoplastic phase. The first phase is graftlinked to the outer, rigid phase, either with a separate graftlinking monomer or, in the case of conjugated diene first-phase polymers, with residual unsaturated groups in the first-phase polymer. If graftlinker is present, it is preferably present at from about 0.1 to about 5%. One or more intermediate phases are optional; for example, an intermediate phase polymerized from about 75 to 100% by weight styrene may be used. The first phase preferably has a glass-transistion temperature ($T_G$) below about 0° C. The monomer or monomer mixture which yields a rubbery polymer on polymerization is preferably an alkyl acrylate, the alkyl group having from 1 to 6 carbon atoms, preferably butyl acrylate or butadiene or other conjugated diene, as for example isoprene, and including cyclic dienes such as cyclopentadiene, but it may also be a urethane or siloxane, or a semi-crosslinked ethylene-propylene elastomer, or similar monomers producing rubbery polymers. These monomers may be mixed together in any proportions, and they may incorporate minor amounts (less than 50% by weight) of copolymerizable vinylic monomers which form rubbery or non-rubbery polymers on polymerization. A preferred copolymerizable vinylic monomer is styrene. The crosslinking monomer is a polyethylenically unsaturated monomer copolymerizable with the other core monomers, the reactivity of its unsaturated groups being such that essentially all of them react during the initial polymerization; examples of crosslinking monomers include butylene diacrylate or dimethacrylate, divinyl benzene, trimethylolpropane trimethacrylate or triacrylate and the like. The graftlinking monomer is a polyethylenically unsaturated monomer copolymerizable with the other core monomers and having sufficiently low reactivity of one or more of the unsaturated groups to allow significant residual unsaturated to remain in the core polymer subsequent to its polymerization. Examples of graftlinking monomers are allyl methacrylate, diallyl maleate, and the like. The outer, rigid thermoplastic phase is polymerized from a monomer system comprising from about 50 to 100% by weight of an alkyl methacrylate, the alkyl group having 1 to 4 carbon atoms. The core/shell polymers are prepared using conventional emulsion polymerization techniques.

The aromatic polycarbonate useful in the present invention is preferably a polycarbonate of a di(monohydroxyphenol)-substituted aliphatic hydrocarbon. For example, it is possible to use an aromatic polycarbonate derived by the ester exchange process or phosgene process from 2,2-(4,4'-dihydroxy diphenol) propane, this aromatic polycarbonate being known as bisphenol A. Other polycarbonates may similarly be made from 4,4'-dihydroxy diphenol alkane, 4,4'-dihydroxy diphenol sulfone, or 4,4'-dihydroxy diphenol ether, or mixtures thereof. The polycarbonate preferably has a molecular weight of from about 15,000 to about 100,000, and more preferably from about 20,000 to about 50,000.

The aromatic polyester crystallization-rate accelerator is preferably a poly(alkyl terephthalate), the alkyl group containing 4 to 6 carbon atoms, more preferably poly(butylene terephthalate). The preferred poly(butylene terephthalate) has a molecular weight indicated by an intrinsic viscosity of from about 0.9 to about 1.2 deciliters per gram. The preferred amount of the polyester crystallization rate modifier is from about 1 to about 5% by weight of the polymer composition. This range is critical in that too little crystallization-rate accelerator will allow the extruded polymer composition sheet to crystallize too slowly for a practical thermoforming operation, but excessive crystallization-rate accelerator will tend to crystalline the polymer before the quenching or thermoforming steps can be completed.

To form the modified polyester of the present invention the core/shell polymer, polyester crystallization-rate accelerator and optional aromatic polycarbonate are blended in any order with the polyester matrix polymer, using conventional melt-blending techniques. The preferred melt-blending temperature is above 260° C., which is the melting temperature of the poly(ethylene terephthalate) matrix polymer, but below about 285° C. to reduce degradation of any of the polymer components. Blending energy and time should be sufficient to assure thorough mixing of the components.

The ovenable trays of the present invention are prepared by forming a thin, amorphous sheet, typically from about 0.5 to about 1.5 mm thick, from the above modified PET, as by extrusion or rolling, at a melt temperature above 260° C., immediately quenching the sheet to a temperature below about 75° C. fo fix the sheet in the amorphous state, and cutting from this sheet a tray blank approximately the size of the finished tray. This blank is reheated, typically to about 160°-170° C. and formed into the tray shape in a thermoforming mold. It is allowed to remain in the mold for a few seconds, typically from about 5 to about 10 seconds, to allow the amorphous polymer composition to crystallize, and is then removed from the mold. The formed and crystallized tray is suitable for low temperature storage as well as heating of foods.

The following examples are intended to exemplify the invention, and not to limit it except as it is limited in the claims. All percentages are by weight unless otherwise specified and all reagents are of good, commercial grade, except as otherwise specified.

EXAMPLE 1

This example illustrates preparation of poly(ethylene terephthalate), hereinafter designated PET, and preparation of tray samples from unmodified PET. The PET used in this and subsequent examples have an intrinsic viscosity, measured at 30° C. in 60/40 phenol/tetrachloroethane solution, of 0.80 deciliters per gram (dl/g). Such a PET may be made by transesterifying dimethyl terephthalate and ethylene glycol at atmospheric pressure at 160° C. to 250° C. using a suitable catalyst, such as cobalt acetate. After a stoichiometric amount of methanol is distilled from the reaction mixture, phosphoric acid is added as a stabilizer, and a polycondensation catalyst such as antimony trioxide is added. While agitating, the temperature of the mixture is increased to 280° C. and the reaction vessel is evacuated. When the intrinsic viscosity of the polymer reaches 0.62 dl/g, the polymer is removed from the reactor in strands, and is cooled and cut into pellets. The pellets are crystallized by heating them to 125° C. for 15 minutes, and the crystallized pellets are further polymerized by heating them at 200° C. in a stream of nitrogen gas until the intrinsic viscosity of the resin reaches 0.80 dl/g. The pellets are then cooled and stored.

Such pellets, having an intrinsic viscosity of 0.80 dl/g were dried to less than 0.005% moisture, melted at 275° C., and extruded into strands using a two-stage mixing screw. The strands were then cut into pellets. This step was added as a control, so that unmodified PET experienced the same processing history as the modified PET of subsequent examples. The pellets were subsequently extruded into a 0.75 mm (0.030 mil) sheet using a conventional sheet die. The sheet was cooled rapidly as it left the die, so that it was largely amorphous. Strips were cut from the sheet and immersed in a silicone oil bath at a 160° C. for 15, 20 or 25 seconds, as indicated in Table I, and then immediately quenched in 0°-4° C. water. Samples cut from these conditioned strips were tested by differential scanning calorimetry at a temperature increase rate of 20° C. per minute; the differential temperature versus time was recorded as the samples first crystallized and then melted. The areas under the differential temperature curves for the exotherm and endotherm were determined and the heats of crystallization and melting were calculated in calories per gram from the sample weight, calibration constant of the calorimeter, and the differential temperature curve areas. The difference between the endothermic and exothermic heats of melting and crystallization, divided by the theoretical heat of fusion of completely crystallized PET (27 calories/gram) yielded the percentage of crystallinity of each sample. Table I shows the results of this example.

EXAMPLE 2

This example illustrates the addition of a crystallization-rate accelerator to the PET matrix resin. Three parts of poly(butylene terephthalate) having an intrinsic viscosity of 1.1 dl/g (Valox TM 310, from General Electric Corp.) were mixed with 97 parts of PET resin having an intrinsic viscosity of 0.80 dl/g; this mixture of pellets was thoroughly dried, melted and extruded at 275° C. in an extruder equipped with a two-stage screw to form strands of the polymer blend. The strands were cut into pellets which were thoroughly dried and extruded into 0.75-mm sheet as described in Example 1. the crystallinity of this sheet was determined as described in Example 1, and the results are listed in Table I.

EXAMPLE 3

This example illustrates an ovenable tray composition of the present invention. For this example 87 parts of the PET of Example 1, three parts of the poly(butylene terephthalate) of Example 2, 2.5 parts of bisphenol-A-based polycarbonate resin (Marlon TM N-50 from Mobay Chemical Corp.), and 7.5 parts of a core/shell polymer having 80 parts core polymer of 99 parts butyl acrylate, 0.5 parts butylene glycol diacrylate and 0.5 parts allyl methacrylate and 20 parts shell polymer of methyl methacrylate were mixed and thoroughly dried. The mixture was melted and extruded at 275° C. from a two-stage mixing screw extruder into strands. The strands were cut into pellets, dried and extruded into a 0.75-mm sheet; the degree of crystallization of the sheet was determined according to the procedure described in Example 1 and the results are shown in Table I.

EXAMPLE 4

This Example illustrates the ovenable tray composition with the poly(butylene terephthalate) omitted. The sheet was prepared according to the procedure of Example 3, the three-parts of poly(butylene terephthalate) in the blend being replaced by an equal amount of additional PET. The results of testing are shown in Table I.

EXAMPLE 5

This Example repeats the procedure of Example 4 using a different ratio of components. The procedure of Example 3 was repeated; the amounts of the components were 77 parts PET, 3 parts poly(butylene terephthalate) and 15 parts core/shell polymer and 5 parts polycarbonate. The results of testing are shown in Table I; they demonstrate that the crystallization rate of the composition decreases as the concentration of components that increase impact strength increases.

EXAMPLE 6

This example illustrates preparation of simulated ovenable trays from the compositions prepared according to the preceding examples. Samples 7.6 cm square were out from the 0.75-mm-thick extruded sheets of polymer prepared in Examples 1 through 5. The samples were placed between two polished steel caul plates and heated in a 125° C. oven for one hour to crystallize the polymer. The cooled sample from Example 1 was tested by differential scanning calorimetry as described in Example 1, and was found to have a crystallinity of 33%. Each of the samples was tested for impact strength at −18° C. using a Dynatup tester. In this test a 13.6-Kg weight with a 1.27-cm-diameter impact head is dropped on the sample at 3 meters per second. An area of the sample 3.18 cm in diameter, located directly under the impact head, is unsupported. The breaking strength of the sample is measured in Joules. For this test the samples and the impact site of the tester were cooled to −18° C. Results of this test are shown in Table I.

TABLE I

| Sample from Example No. | Crystallinity after Time at 160° C.[1] | | | | Impact Strength[2] Joules |
|---|---|---|---|---|---|
| | 0 sec | 15 sec | 20 sec | 25 sec | |
| 1 | 4.4% | 5.6% | 6.3% | 17.0% | 0.11 |
| 2 | 7.8 | 25.2 | 28.9 | 29.6 | 0.09 |
| 3 | 8.1 | 18.9 | 24.1 | 28.9 | 1.40 |
| 4 | 6.7 | 11.9 | 20.4 | 24.1 | 2.43 |
| 5 | 4.8 | 8.8 | 18.9 | 18.5 | 4.86 |

[1] 0.75-mm-thick sheet
[2] 0.75-mm-thick sheet, at −18° C.: Dynatup dart impact strength.

EXAMPLE 7

This example illustrates additional testing of the simulated ovenable trays of the preceding example. Dimensional stability of the sheet prepared in Example 3 and crystallized according to Example 6 was measured by cutting a 7.6-cm×2-cm strip from the sheet and precisely measuring a 5-cm interval on the strip. The strip was heated at 200° C. and held at that temperature for one hour; it showed no evidence of warping or bending. It was removed from the oven, cooled and remeasured; the 5-cm interval remained unchanged. This example shows that the components promoting impact strength do not adversely affect dimensional stability of the tray composition under conditions that simulate actual use.

EXAMPLE 8

This Example represents an unmodified PET such as may be made according to Example 1. This PET is Goodyear TM clear tough 1006B resin from Goodyear Tire & Rubber Co., and has an intrinsic viscosity, measured according to the parameters give in Example 1, of 1.04 dl/g. The resin was extruded into strands under the following conditions:
  2.5-cm Killion single-screw extruder, L/D=24/1, with two-stage, high-work, vacuum-vented screw with water on the feed throat
  Screw speed 60 rpm at 5.0–6.0 amperes
  Die pressure 700–2800 KPa
  Rear set temperature 260° C.
  Middle set temperature 260° C.
  Front set temperature 274° C.
  Nozzle set temperature 274° C.
The strands were cut into pellets which were dried and extruded into sheet at the following conditions:
  2.5 cm Killion single-screw extruder, L/D=24/1, with single-stage screw
  No vacuum, with water on the feed throat
  Screw speed 60 rpm at 4.8–5.5 amperes
  Die pressure 4100–8300 KPa
  Rear set temperature 288° C.

Middle set temperature 288° C.
Front set temperature 274° C.
Die set temperature 260° C.
Roller temperature Full cooling Samples were cut, crystallized by annealing for 1 hour at 125° C., and tested for impact strength as described in Example 6. The results of the tests are shown in Table II.

EXAMPLE 9

This example illustrates a polyester resin containing only the crystallization-rate accelerator. The procedure of Example 8 was repeated except that 3% by weight, based on the total resin weight, of the poly(butylene terephthalate) of Example 2 was mixed with the PET prior to the strand extrusion step. The results of testing are shown in Table II.

EXAMPLE 10

This example illustrates the polyester matrix resin with the crystallization-rate accelerator and the aromatic polycarbonate. The procedure of Example 9 was repeated, except that 2.5% by weight, based on the total resin weight, of the aromatic polycarbonate of Example 3 was mixed with the PET and poly(butylene terephthalate) prior to the strand extrusion step. The results of testing are shown in Table II.

EXAMPLE 11

This example illustrates the modified polyester resins of the present invention. The procedure of Example 10 was repeated, except that 7.5% by weight (based on the total resin weight) of the core/shell polymer of Example 3 was mixed with the PET, poly(butylene terephthalate) and aromatic polycarbonate prior to the strand extrusion step. The results of testing are shown in Table II.

EXAMPLE 12

This example illustrates another embodiment of the present invention, using a different impact modifier. The procedure of Example 11 was repeated, except that the impact modifier was replaced with the same amount of a core/shell polymer having a core polymerized from 71 parts butadiene, 3 parts styrene, 4 parts methyl methacrylate and 1 part divinylbenzene, a second stage polymerized from 11 parts styrene, and an outer shell polymerized from 11 parts methyl methacrylate and 0.1 part 1,3-butylene glycol dimethacrylate. The results of testing are shown in Table II.

TABLE II

| Sample from Example No. | Thickness, mm | Dynatup Dart Impact Strength, Joules | |
|---|---|---|---|
| | | 23° C. | −18° C. |
| 8 | 0.76 | 0.7 | 0.1 |
| 9 | 0.76 | 0.4 | 0.1 |
| 10 | 0.76 | 1.6 | 0.1 |
| 11 | 0.76 | 9.8 | 2.8 |
| 12 | 0.76 | 12.6 | 6.4 |

I claim:

1. A tough, ovenable tray comprising a thermoformed, crystalline sheet of modified polyester resin, the resin comprising
   (A) from about 70 to about 95% of a poly(ethylene terephthalate) resin having an intrinsic viscosity from about 0.7 to about 1.1 dl/g,
   (B) from about 4 to about 29% of core/shell polymer having
      (1) from about 25 to about 95% of a first elastomeric phase polymerized from a monomer system comprising
         (a) from about 75 to about 99.8% of a monomer or monomer mixture which yields a rubbery polymer on polymerization,
         (b) from about 0.1 to about 5% crosslinking monomer, and
         (c) from about 0 to about 5% graftlinking monomer, and
      (2) from about 5 to about 75% of a rigid vinyl thermoplastic phase polymerized from a monomer system comprising from about 50 to 100% of an alkyl methacrylate wherein the alkyl group has from 1 to 4 carbon atoms,
   (C) from about 1 to about 5% of a poly(alkylene terephthalate) crystallization-rate accelerator, the alkylene group having from 4 to 6 carbon atoms, and
   (D) from 0 to about 14.5% of an aromatic polycarbonate of a di(monohydroxyphenol)-substituted aliphatic hydrocarbon wherein the hydrocarbon has 2 to 4 carbon atoms.

2. The ovenable tray of claim 1 wherein the intrinsic viscosity of the poly(ethylene terephthalate) is from about 0.72 to about 0.95 dl/g.

3. The ovenable tray of claim 1 wherein the crosslinking monomer in the first elastomeric phase is butylene glycol dimethacrylate.

4. The ovenable tray of claim 1 wherein the crosslinking monomer in the first elastomeric phase is divinylbenzene.

5. The ovenable tray of claim 1 wherein the monomer mixture which yields a rubbery polymer on polymerization includes butadiene.

6. The ovenable tray of claim 1 wherein the monomer mixture which yields a rubbery polymer on polymerization comprises a mixture of butadiene and styrene.

7. The ovenable tray of claim 1 wherein the glass-transition temperature of the first elastomeric phase is below about 0° C.

8. The ovenable tray of claim 1 wherein the crystallization-rate accelerator is poly(butylene terephthalate).

9. The ovenable tray of claim 8 wherein the poly(butylene terephthalate) has an intrinsic viscosity of from about 0.9 to about 1.2 dl/g.

10. The ovenable tray of claim 1 wherein the monomer which yields a rubbery polymer on polymerization is butyl acrylate.

11. The ovenable tray of claim 7 wherein the graftlinking monomer is present at from about 0.1% to about 5%.

12. The ovenable tray of claim 7 wherein the graftlinking monomer in the first elastomeric phase is allyl methacrylate.

13. A rapid-crystallizing, modified polyester resin comprising
   (A) from about 70 to about 95% of a poly(ethylene terephthalate) resin having an intrinsic viscosity of from about 0.7 to about 1.1 dl/g,
   (B) from about 4 to about 29% of a core/shell polymer having
      (1) from about 25 to about 95% of a first elastomeric phase polymerized from a monomer system comprising (a) from about 75 to about 99.8% of a monomer or monomer mixture which yields a rubbery polymer on polymerization,
(b) from about 0.1 to about 5% crosslinking monomer, and
(c) from about 0 to about 5% graftlinking monomer, and
(2) from about 5 to about 75% of a rigid vinyl thermoplastic phase polymerized from a monomer system comprising from about 50 to 100% of an alkyl methacrylate wherein the alkyl group has from 1 to 4 carbon atoms,
(C) from about 1 to about 5% of poly(alkylene terephthalate), the alkylene group having from 4 to 6 carbon atoms, and
(D) from 0 to about 14.5% of an aromatic polycarbonate of a di(monohydroxyphenol)-substituted aliphatic hydrocarbon wherein the hydrocarbon has 2 to 4 carbon atoms.

14. The modified polyester resin of claim 13 wherein the intrinsic viscosity of the poly(ethylene terephthalate) is from about 0.72 to about 0.95 dl/g.

15. The modified polyester resin of claim 13 wherein the crystallization-rate accelerator is poly(butylene terephthalate).

16. The modified polyester resin of claim 15 wherein the poly(butylene terephthalate) has an intrinsic viscosity of from about 0.9 to about 1.2 dl/g.

17. The modified polyester resin of claim 13 wherein the crosslinking monomer in the first elastomeric phase is butylene glycol dimethacrylate.

18. The modified polyester resin of claim 13 wherein the crosslinking monomer in the first elastomeric phase is divinylbenzene.

19. The modified polyester resin of claim 13 wherein the monomer mixture which yields a rubbery polymer on polymerization includes butadiene.

20. The modified polyester resin of claim 13 wherein the monomer mixture which yields a rubbery polymer on polymerization comprises a mixture of butadiene and styrene.

21. The modified polyester resin of claim 13 wherein the glass-transition temperature of the first elastomeric phase is below about 0° C.

22. The modified polyester resin of claim 13 wherein the monomer which yields a rubbery polymer on polymerization is butyl acrylate.

23. The modified polyester resin of claim 22 wherein the graftlinking monomer is present at from about 0.1 to about 5%.

24. The modified polyester resin of claim 23 wherein the graftlinking monomer in the first elastomeric phase is allyl methacrylate.

25. A rapid-crystallizing sheet of amorphous, modified polyester resin suitable for forming tough, ovenable trays comprising
(A) from about 70 to about 95% of a poly(ethylene terephthalate) resin having an intrinsic viscosity of from about 0.7 to about 1.1 dl/g,
(B) from about 4 to about 29% of a core/shell polymer having (1) from about 25 to about 95% of a first elastomeric phase polymerized from a monomer system comprising
(a) from about 75 to about 99.8% of a monomer or monomer mixture which yields a rubbery polymer on polymerization,
(b) from about 0.1 to about 5% crosslinking monomer, and
(c) from about 0 to about 5% graftlinking monomer, and
(2) from about 5 to about 75% of a rigid vinyl thermoplastic phase polymerized from a monomer system comprising from about 50 to 100% of an alkyl methacrylate wherein the alkyl group has from 1 to 4 carbon atoms,
(C) from about 1 to about 5% of a poly(alkylene terephthalate), the alkylene group having from 4 to 6 carbon atoms, and
(D) from 0 to about 14.5% of an aromatic polycarbonate of a di(monohydroxyphenol)-substituted aliphatic hydrocarbon wherein the hydrocarbon has 2 to 4 carbon atoms.

26. The rapid-crystallizing sheet of claim 25 wherein the sheet is from about 0.5 to about 1.5 mm thick.

27. The rapid-crystallization sheet of claim 25 wherein the intrinsic viscosity of the poly(ethylene terephthalate) is from about 0.72 to about 0.95 dl/g.

28. The rapid-crystallizing sheet of claim 25 wherein the crosslinking monomer in the first elastomeric phase is butylene glycol dimethacrylate.

29. The rapid-crystallizing sheet of claim 25 wherein the crosslinking monomer in the first elastomeric phase is divinylbenzene.

30. The rapid-crystallizing sheet of claim 25 wherein the monomer mixture which yields a rubbery polymer on polymerization includes butadiene.

31. The rapid-crystallizing sheet of claim 25 wherein the monomer mixture which yields a rubbery polymer on polymerization comprises a mixture of butadiene and styrene.

32. The rapid-crystallizing sheet of claim 25 wherein the glass-transition temperature of the first elastomeric phase is below about 0° C.

33. The rapid-crystallizing sheet of claim 25 wherein the intrinsic viscosity of the poly(ethylene terephthalate) is from about 0.7 to about 1.1 dl/g.

34. The rapid-crystallizing sheet of claim 33 wherein the crystallization-rate accelerator is poly(butylene terephthalate).

35. The rapid-crystallizing sheet of claim 34 wherein the poly(butylene terephthlate) has an intrinsic viscosity of from about 0.9 to about 1.2 dl/g.

36. The rapid-crystallizing sheet of claim 25 wherein the monomer which yields a rubbery polymer on polymerization is butyl acrylate.

37. The rapid-crystallizing sheet of claim 36 wherein the graftlinking monomer is present at from about 0.1 to about 5%.

38. The rapid-crystallizing sheet of claim 37 wherein the graftlinking monomer in the first elastomeric phase is allyl methacrylate.

* * * * *

UNITED STATES PATENT AND TRADEMARK OFFICE
CERTIFICATE OF CORRECTION

PATENT NO. : 4,713,268

DATED : December 15, 1987

INVENTOR(S) : William G. Carson

It is certified that error appears in the above-identified patent and that said Letters Patent is hereby corrected as shown below:

In claims 11 and 12, line 1, please replace the numeral "7" with --10--.

Signed and Sealed this

Seventh Day of June, 1988

Attest:

*Attesting Officer*

DONALD J. QUIGG

*Commissioner of Patents and Trademarks*